United States Patent [19]

Tajiri et al.

[11] Patent Number: 4,676,833

[45] Date of Patent: Jun. 30, 1987

[54] METHOD FOR REPRODUCING COMPOSITION OF ELECTROLYTIC POLISHING SOLUTION FOR NIOBIUM MATERIAL

[75] Inventors: Keisuke Tajiri, Aichi; Hirotoshi Nomura, Osaka, both of Japan

[73] Assignee: Mitsubishi Jukogyo Kabushiki Kaisha, Tokyo, Japan

[21] Appl. No.: 816,379

[22] Filed: Jan. 6, 1986

Related U.S. Application Data

[63] Continuation-in-part of Ser. No. 665,169, Oct. 26, 1984, abandoned.

[30] Foreign Application Priority Data

Oct. 26, 1983 [JP] Japan ................... 58-199208

[51] Int. Cl.$^4$ ............................................... C09G 1/02
[52] U.S. Cl. ..................................... 106/1.11; 106/3; 204/231
[58] Field of Search ................... 106/3, 1.11; 204/129.75, 129.80, 129.85; 252/79.3

[56] References Cited

U.S. PATENT DOCUMENTS 2,466,095  4/1949  Gail .
3,290,193  12/1966  Säizle .
4,072,588  2/1978  Diepers ............................ 204/231

OTHER PUBLICATIONS

Chem. Abstract, vol. 83: 87059m., Miga., 1974.
Chem. Abstract, vol. 84: 51,466y., Schmidt, Sep. 75.
Chem. Abstract, vol. 76: 41312, Schmidt, Dec. 71.
Chem. Abstract, vol. 49: 8571, Mitchell, Feb. 55.

*Primary Examiner*—Theodore Morris
*Attorney, Agent, or Firm*—Toren, McGeady & Associates

[57] ABSTRACT

A method of reproducing a composition of an electrolytic polishing solution for a niobium material, characterized in that, when the composition of the electrolytic polishing solution for the niobium material which is composed of HF, $H_2SO_4$ and water is lowered in the concentration of HF, the composition is replenished with fluorosulfuric acid and water in an amount equimolar therewith or so in order to recover the concentration of HF while the content of water is maintained substantially at a constant level.

1 Claim, No Drawings

METHOD FOR REPRODUCING COMPOSITION OF ELECTROLYTIC POLISHING SOLUTION FOR NIOBIUM MATERIAL

CROSS-REFERENCE TO RELATED APPLICATIONS

The present application is a continuation-in-part of copending application Ser. No. 665,169, filed Oct. 26, 1984 now abandoned.

BACKGROUND OF THE INVENTION

The present invention relates to a composition of an electorlytic polishing solution used in carrying out the mirror polishing of niobium materials, above all to a method for reproducing the compostion which has been deteriorated in qualities.

The mirror polishing of the niobium (Nb) material is an essential technique to inhibit energy loss by preventing a high frequency absorption on the surface of the niobium material, when the niobium material is employed for accelerated cavity resonators in which its ultraconductivity is utilized. Such a mirror polishing of the niobium material has been carried out by an electrolytic polishing method similarly to the polishing treatment of other metallic materials. An electrolytic polishing solution used in such a conventional polishing treatment particularly comprises HF, $H_2SO_4$ and water.

This electrolytic polishing technique for the niobium material is appreciably different from usual cases and will make progress in accordance with the mechanism that an oxide layer is formed on the surface of the niobium material by the action of $H_2SO_4$ during electrical conduction and is then dissolved by the action of HF during interruption of the conduction.

With regard to the aforesaid conventional electrolytic polishing solution, however, the concentration of HF will noticeably drop due to the evaporation of HF and the consumption of HF in an electrolytic polishing reaction and the life of the solution will be extremely shortened. With the aim of overcoming such a problem, various researches have been conducted on methods for lengthening the life of the electrolytic polishing solution, and there are now known a method for supplementally adding hydrofluoric anhydride and another method for a replenishment of hydrofluoric acid.

However, hydrofluoric anhydride has a boiling point of 19.4° C. and is thus gasified at ordinary temperature. Therefore, the material can be used only in a cool state of 0° C. or less. In addition thereto, the hydrofluoric anhydride material is still liable to evaporate even in a cool state of 0° C. or less and its vapor pressure will increase, which means that it is very dengerous at its handling. In the case of another method mentioned above, when hydrofluoric acid is supplementally added, the content of water in the electrolytic polishing solution will increase owing to the addition of water contained in hydrofluoric acid, with the result that a polishing performance will be deteriorated. Since having such problems, the methods of supplementally adding hydrofluoric anhydride and hydrofluoric acid are impractical in fact. Accordingly, in former days, the electrolytic polishing solution the concentration of HF in which has already dropped has been thrown away without being reused, which causes the increase in cost and which is a great obstacle to the improvement in a working efficiency at mass production.

SUMMARY OF THE INVENTION

The present invention has been accomplished in view of the above-mentioned circumstances, and it can provide a method for reproducing a composition of an electrolytic polishing solution for niobium materials by which the concentration of HF can safely be recovered without increasing the content of water in the solution, when the composition of the electrolytic polishing solution for the niobium material which is composed of HF, $H_2SO_4$ and water is lowered in the concentration of HF and its performance becomes unsatisfactory.

That is to say, the present invention is directed to a method for reproducing a composition of an electrolytic polishing solution for a niobium material, characterized in that, when the composition of the electrolytic polishing solution for the niobium material which is composed of HF, $H_2SO_4$ and water is lowered in the concentration of HF, the composition is replenished with fluorosulfuric acid and water in an amount equimolar therewith or so in order to recover the concentration of HF while the content of water therein is maintained substantially at a constant level.

DETAILED DESCRIPTION OF THE INVENTION

The gist of the present invention is that a solution is replenished with fluorosulfuric acid and water for regulating a composition of the solution in place of hydrofluoric anhydride or hydrofluoric acid, and it is based on the following fact.

That is to say, as a result of analytical researches by the inventors of the present application, the following has been found. In the electrolytic polishing solution comprising HF, $H_2SO_4$ and water, a part of HF is present in a free state and the residue thereof exists in the form of fluorosulfuric acid ($HSO_3F$). And when the amount of free HF is decreased due to its evaporation and consumption in an electrolytic polishing reaction, fluorosulfuric acid will promptly be hydrolyzed in accordance with a reaction given below in order to supply new free HF and to thereby maintain the concentration of free HF at a constant level:

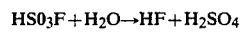

$$HSO_3F + H_2O \rightarrow HF + H_2SO_4$$

The inventors of the present case have paid attention to this fact and have achieved the present invention by which fluorosulfuric acid is supplementally added as a source of HF. In this method, there is not such a danger as will be brought about in the process in which hydrofluoric anhydride is employed, and the concentration of HF can be recovered constantly retaining the content of water in the solution since water which is added to regulate the composition of the solution will be consumed in the hydrolysis of fluorosulfuric acid, as be definite from the above chemical formula.

The electrolytic polishing solution is composed of 0.3 to 0.7 mol/l of HF, 14.0 to 20.0 mol/l of $H_2SO_4$, 1.1 to 2.0 mol/l of $HSO_3F$, 6.0 to 8.5 mol/l of $H_2O$. The fluorosulfuric acid and water are added in 0.8 to 1.1 equimolar amounts of water to the fluorosulfuric acid and the water content of the solution is maintained at from 6.0 to 8.5 mol/l.

The present invention will be described in detail in the following example.

Example

An electrolytic polishing solution comprising HF, $H_2SO_4$ and water was first prepared in accordance with the following procedure, and the electrolytic polishing of a niobium material was carried out using this electrolytic polishing solution. The reproduction of the used polishing solution in which the concentration of HF was lowered was tried through the present invention.

(I) Blended were 895 cc/l of 98% concentrated sulfuric acid, 90 cc/l of 46% hydrofluoric acid and 15 cc/l of water to prepare a composition of the electrolytic polishing solution for the niobium material.

Concentrations of fluorosulfuric acid and free HF in the prepared electrolytic polishing solution were measured. The obtained results are as follows:

Fluorosulfuric acid : 167 g/l
Free HF : 11 g/

(II) The electrolytic polishing of the niobium material was carried out using the thus prepared electrolytic polishing solution under conditions of 30° C. and 20 V for 4 hours (60 cycles of 2 minute's conduction and 2 minute's interruption of the conduction).

After the completion of the electrolytic polishing, concentrations of fluorosulfuric acid and free HF in the used polishing solution were measured. The obtained results are as follows:

Fluorosulfuric acid : 129 g/l
Free HF 11 g/l (III) This used electrolytic polishing solution was replenished with 42 g/l of fluorosulfuric acid and 8.4 g/l of water in order to reproduce the polishing solution. At this time, the operation of reproducing the solution could be carried out safely. This reason is that fluorosulfuric acid has a boiling point as high as 163.5° C. and thus is not gasified at ordinary temperature so long as it is not brought into contact with wet air.

With regard to the electrolytic polishing solution which was reproduced, concentrations of fluorosulfuric acid and free HF were measured, and from the following results obtained, it was confirmed that the compostion of the polishing solution was recovered substantially up to the original state.

Fluorosulfuric acid : 164 g/l
Free HF : 11 g/l

Incidentally, since the concentration of free HF corresponds to the content of water, by the fact that the concentration of free HF is constant before and after the reproduction, it is meant that the reproduction was carried out maintaining the content of water in the solution at a constant level. (IV) Next, the electrolytic polishing was accomplished using the thus reproduced electrolytic polishing solution at 30° C. and 20 V for 4 hours (60 cycles of 2 minute's condution and 2 minute's interruption of the condution), i.e. under the same conditions as in the case that the above-mentioned new virgin polishing solution was employed. The reproduced solution were compared with the aforesaid virgin solution in points of electrolytic polishing effects such as appearance and coarseness on polished surfaces and polishing speeds. The results are as follows:

Appearance on polished surfaces
  Vrgin solution : A bright, uniform and smooth surface was obtained.
  Reproduced solution : A bright, uniform and smooth surface was obtained.

Coarseness on polished surfaces
  Vergin solution :
    1 2 $\mu$RZ before polishing
    0.3 $\mu$RZ after polishing
  Reproduced solution :
    1.2 $\mu$RZ before polishing
    0.3 $\mu$RZ after polishing Polishing speeds (during conduction, in both cases)
  Vergin solution : 0.92 $\mu$/min on either surface
  Reproduced solution : 0.91 $\mu$/min on either surface These results indicate that the composition of the electrolytic polishing solution which was reproduced in the example described above had the same qualities as the initially prepared virgin polishing solution.

As be apparent from the foregoing, according to the present invention, when the concentration of HF in the compostion of the electrolytic polishing solution comprising HF, $H_2SO_4$ and water is lowered and its performance is thus deteriorated, the concentration of HF can safely be recovered without heightening the content of water in the solution, with the consequence that there can be obtained remarkable effects such as the decrease in cost and the improvement in working efficiency at mass production.

We claim:

1. A method for replenishing an electrolytic polishing solution for niobium material composed of 0.3–0.7 mol/l of HF, 14.0–20.0 mol/l of $H_2SO_4$, 1.1–2.0 mol/l of $HSO_3F$, and 6.0–8.5 mol/l of $H_2O$ of which the HF and $HSO_3F$ concentration has been decreased, comprising adding fluorosulfuric acid and water in 0.8 to 1.1 equimolar amounts of water to fluorosulfuric acid to the solution while maintaining the water content at 6.0–8.5 mol/l to restore the HF and $HSO_3F$ concentration of the solution.

* * * * *